US012424078B2

(12) United States Patent
Farley et al.

(10) Patent No.: US 12,424,078 B2
(45) Date of Patent: Sep. 23, 2025

(54) ADDRESSABLE SAFETY DEVICE WITH AN OPTICALLY READABLE AND REMOVABLE ADDRESSING MECHANISM

(71) Applicant: Tyco Fire & Security GmbH, Neuhausen am Rheinfall (CH)

(72) Inventors: Joseph D. Farley, Warwick, MA (US); John Bradley Stowell, Hollis, NH (US); Stephen John Penney, Feltham (GB)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 0 days.

(21) Appl. No.: 18/272,515

(22) PCT Filed: Dec. 16, 2021

(86) PCT No.: PCT/US2021/072964
§ 371 (c)(1),
(2) Date: Jul. 14, 2023

(87) PCT Pub. No.: WO2022/155011
PCT Pub. Date: Jul. 21, 2022

(65) Prior Publication Data

US 2024/0412618 A1 Dec. 12, 2024

Related U.S. Application Data

(60) Provisional application No. 63/138,137, filed on Jan. 15, 2021.

(51) Int. Cl.
*G08B 25/00* (2006.01)

(52) U.S. Cl.
CPC .................................. *G08B 25/003* (2013.01)

(58) Field of Classification Search
None
See application file for complete search history.

(56) References Cited

U.S. PATENT DOCUMENTS 10,644,464 B1 * 5/2020 Roberts ................ H01R 13/701

FOREIGN PATENT DOCUMENTS

| | | | |
|---|---|---|---|
| EP | 0362985 | B1 | 8/1994 |
| GB | 2454684 | A | 5/2009 |
| WO | 2020162957 | A1 | 8/2020 |

OTHER PUBLICATIONS

International Search Report and Written Opinion issued in International Patent Application No. PCT/US2021/072964 on Apr. 20, 2022.

* cited by examiner

*Primary Examiner* — K. Wong
(74) *Attorney, Agent, or Firm* — ArentFox Schiff LLP

(57) ABSTRACT

Example implementations include an addressable device having a base unit mountable on a structure and a device head removably mountable onto the base unit. A removable addressing mechanism is removably mountable onto the base unit and is configured for setting an address for the addressable device. The device head includes an optical address detection mechanism that, when the device head and the removable addressing mechanism are mounted onto the base unit, is configured to align with the removable addressing mechanism to optically read the address configured in the removable addressing mechanism. The removable addressing mechanism is electrically isolated from the base unit, the device head, and the optical address detection mechanism.

20 Claims, 10 Drawing Sheets

ADDRESSABLE SAFETY DEVICE WITH AN OPTICALLY READABLE AND REMOVABLE ADDRESSING MECHANISM

CROSS-REFERENCE TO RELATED APPLICATIONS

The present application is a 35 U.S.C. § 371 National Phase Application of PCT Application No. PCT/US2021/072964 filed Dec. 16, 2021, entitled "ADDRESSABLE SAFETY DEVICE WITH AN OPTICALLY READABLE AND REMOVABLE ADDRESSING MECHANISM," which claims the benefit of U.S. Provisional Application No. 63/138,137 filed Jan. 15, 2021, the contents of all of which are incorporated by reference in the entirety.

The present application is related to International Publication Nos. WO/2020/162954, WO/2020/162955, and WO/2020/162956. The present application is also related to U.S. Provisional Application No. 62/801,469 from which the aforementioned International Publications claim the benefit of. The contents of each of the foregoing are incorporated by reference in the entirety.

FIELD

The present disclosure relates generally to security/automation systems, and more particularly, to addressable devices in security/automation systems.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An example implementation includes an addressable device having a base unit mountable on a structure. The addressable device further includes a device head removably mountable onto the base unit. A removable addressing mechanism is removably mountable onto the base unit and is configured for setting an address for the addressable device. The device head includes an optical address detection mechanism that, when the device head and the removable addressing mechanism are mounted onto the base unit, is configured to align with the removable addressing mechanism to optically read the address configured in the removable addressing mechanism. The removable addressing mechanism is electrically isolated from the base unit, the device head, and the optical address detection mechanism.

Another example implementation includes a removable addressing mechanism having multiple designated positions for configuring an address for an addressable device. The removable addressing is removably mountable onto a base unit of the addressable device. The base unit is mountable on a structure. The addressable device further includes a device head that is removably mountable onto the base unit. The device head includes an optical address detection mechanism that, when the device head and the removable addressing mechanism are mounted onto the base unit, is configured to align with the removable addressing mechanism to optically read the address configured in the removable addressing mechanism. The removable addressing mechanism is electrically isolated from the base unit, the device head, and the optical address detection mechanism.

A further example implementation includes a base unit of an addressable device. The base unit includes a receiving portion configured for removably mounting a removable addressing mechanism thereonto. The removable addressing mechanism is configured for setting an address for the addressable device. The base unit is mountable on a structure. A device head of the addressable device is removably mountable onto the base unit. The device head includes an optical address detection mechanism that, when the device head and the removable addressing mechanism are mounted onto the base unit, is configured to align with the removable addressing mechanism to optically read the address configured in the removable addressing mechanism. The removable addressing mechanism is electrically isolated from the base unit, the device head, and the optical address detection mechanism.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
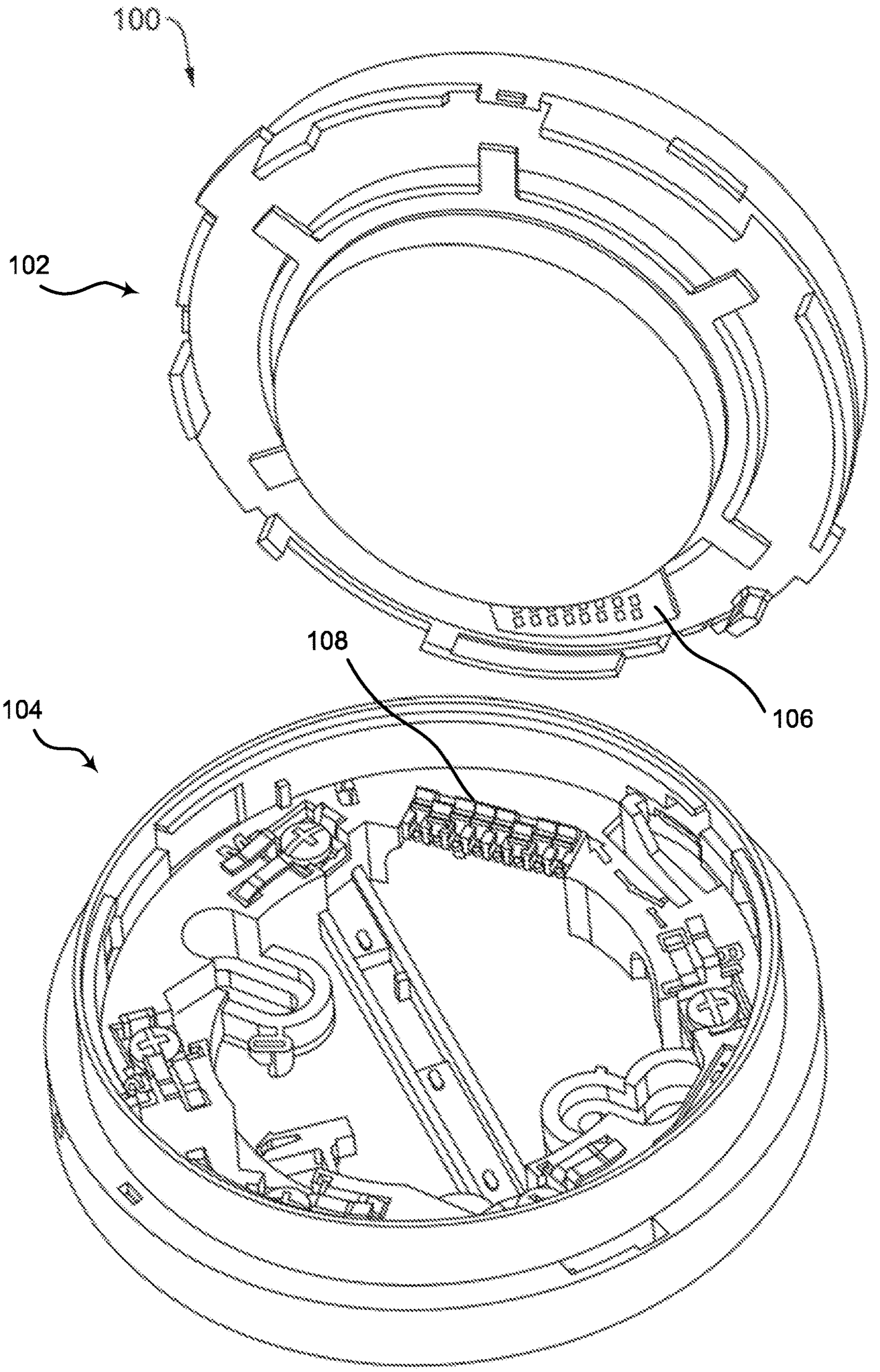
FIG. 1 is an example addressable device having a base unit that includes an optically readable addressing mechanism, according to some aspects.
Figure 2A:
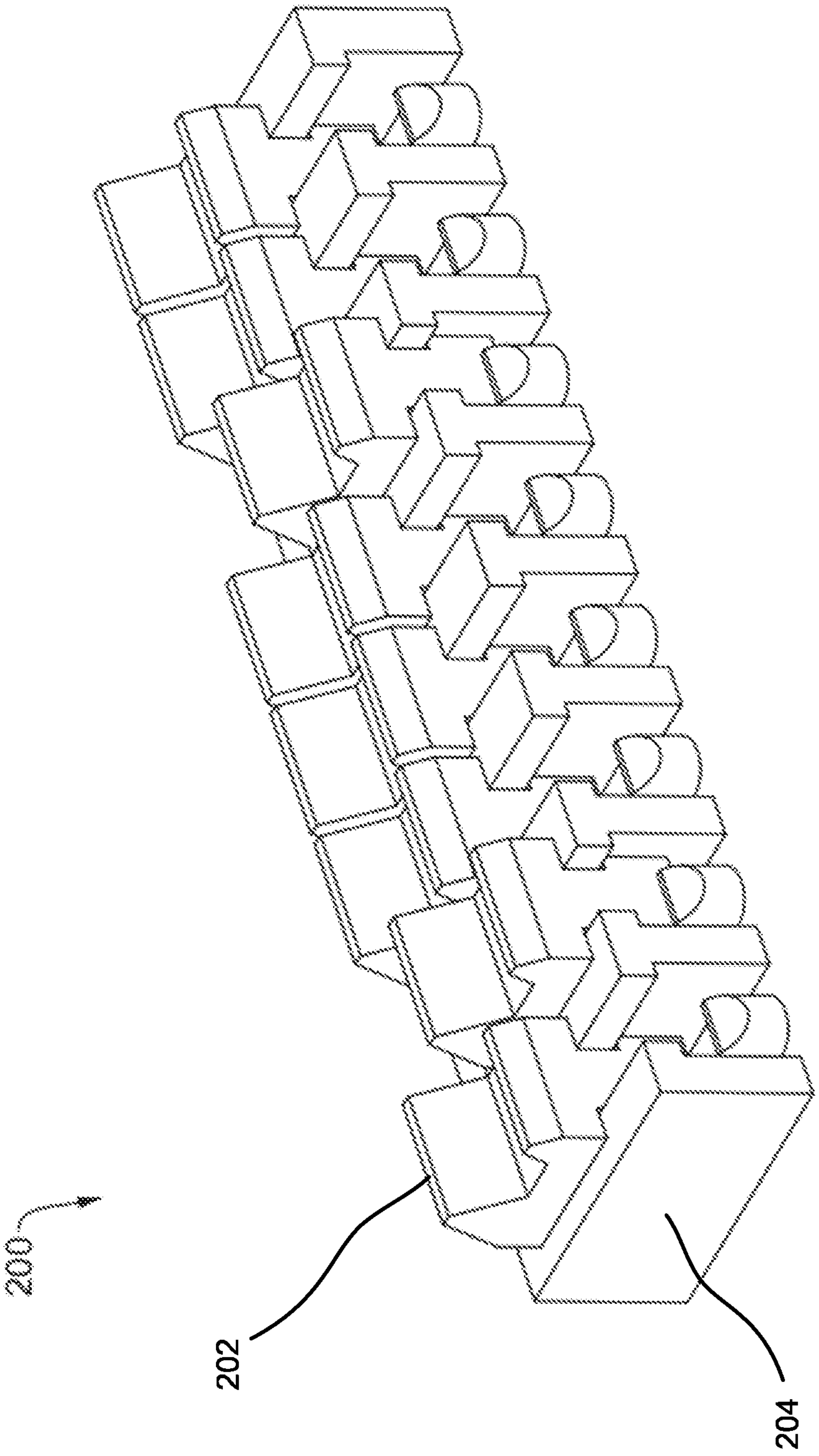
FIG. 2A is an example isometric view of a switch array implementing the optically readable addressing mechanism in FIG. 1, according to some aspects.
Figure 2B:
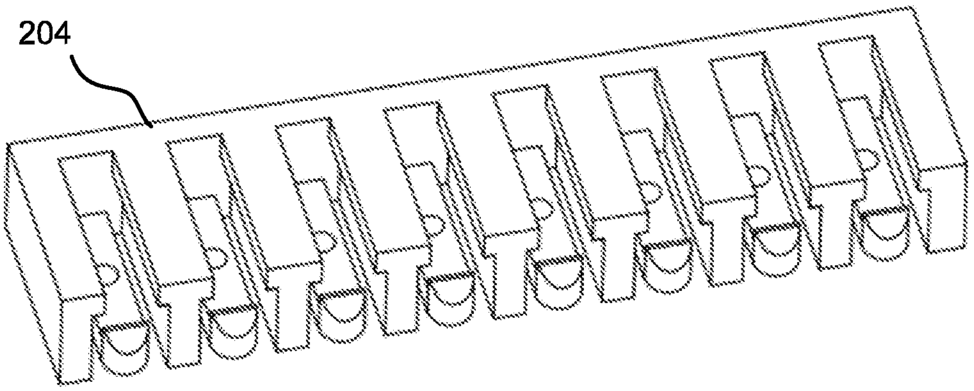
FIG. 2B is an example isometric view of a base portion of a switch array implementing the optically readable addressing mechanism in FIG. 1, according to some aspects.
Figure 2C:
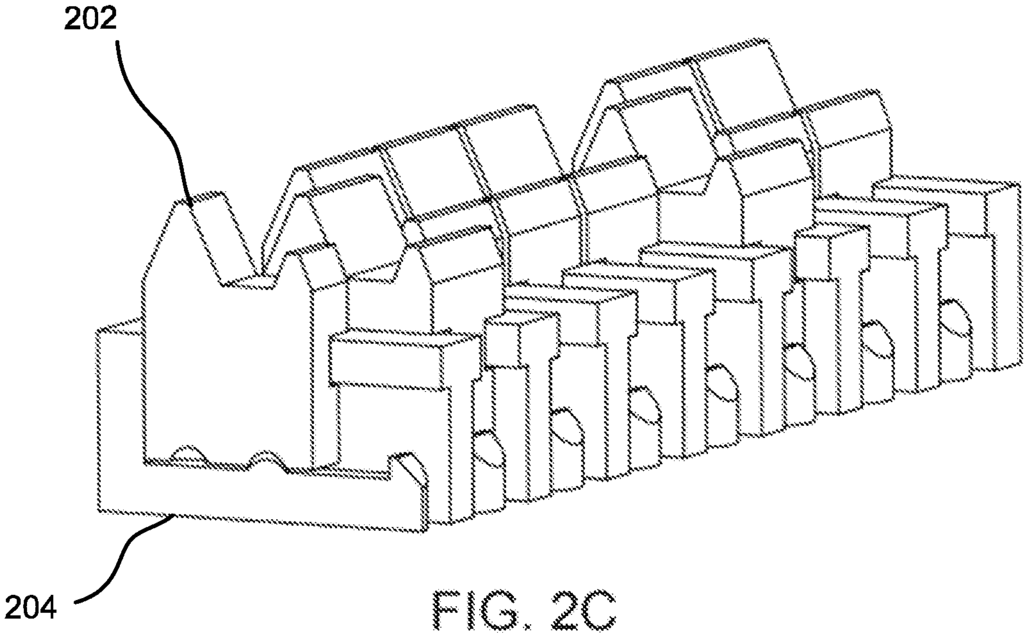
FIG. 2C is an example cross-sectional isometric view of a switch array implementing the optically readable addressing mechanism in FIG. 1, according to some aspects.
Figure 2D:
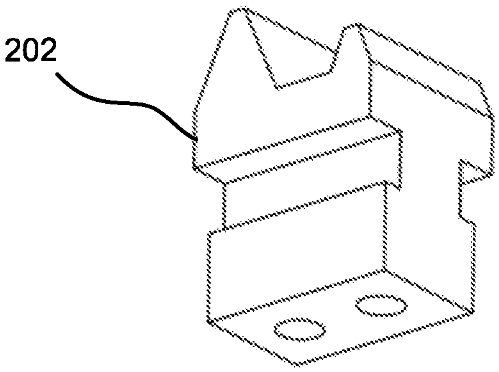
FIG. 2D is an example isometric view of one slide-able button portion in a switch array implementing the optically readable addressing mechanism in FIG. 1, according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components may be shown in block diagram form in order to avoid obscuring such concepts.

Some present aspects implement an addressing mechanism into a base unit onto which a device head of an addressable device in a security/automation system is mounted. The addressing mechanism in the base unit according to the present aspects is removable, non-electronic, and optically readable. In some non-limiting aspects, for example, the addressing mechanism may be a removable non-electronic switch array, a removable address pennant, a tag, etc. The addressing mechanism allows for configuring an address for the device. The device head, which is powered by electricity, determines the device address by reading the addressing mechanism in the base unit of the device, without needing to pass any electrical current through the base unit. If the device head has to be replaced, the device address remains with the base unit, thus no further addressing configurations are needed upon replacement of the device head. Also, since the addressing mechanism is removably implemented in the base unit, an installer may remove the addressing mechanism from the base unit, configure or re-configure the addressing mechanism to a certain device address, and then plug the configured or re-configured addressing mechanism back into the base unit.

In some aspects, the device head may include, for example but not limited to, a sensor/detector unit, a notification unit, etc. For example, in some aspects, the addressable device may be a fire alarm peripheral such as an activation or notification device. The fire alarm peripheral may include a base unit that is permanently installed on a wall or ceiling, and a device head which mounts onto the base unit. The addressing mechanism in the base unit may be used for setting a unique address for the addressable device in a security/automation system that includes multiple addressable devices, so that each addressable device in the security/automation system may be uniquely and individually recognized and addressed. In one non-limiting aspect, for example, the security/automation system may include a loop of up to 250 fire alarm sensors/notification devices (e.g., a pair of wires that provides power and signal connectivity between a fire alarm control panel and up to 250 fire alarm peripherals), where each sensor/device is configured with a unique address. In one non-limiting aspect, for example, the addressable devices in the security/automation system may include an emergency alarm system peripheral, such as a hazard detector, an intrusion detector, a notification appliance, etc., where the peripheral includes a base unit that is in permanently installed on a wall or ceiling, and a device head which mounts to the base unit. In these aspect, the addressing mechanisms provided herein easily and efficiently assign addresses to such emergency alarm system peripherals.

Some other systems may implement an addressing mechanism in the base unit of a device or in the device head, where the addressing mechanism includes electronics and dip switches configurable for setting an address for the device. However, in order to read the address of the device, these systems may require an electric current to be run through the addressing mechanism. Some other alternative systems may implement a purely-electronic addressing mechanism that does not include any dip switches. However, these systems may require a special tool (e.g., a software mechanism) to update the address of the device. Unlike the aforementioned systems, some present aspects implement a non-electronic addressing mechanism that does not require any electricity to be run through the base unit of the device. Also, the non-electronic addressing mechanism according to the present aspects is implemented in the base unit and stays with the base unit during replacement of the device head. Therefore, replacement of the device head does not pose the risk of corrupting the device address.

Some other systems may implement a non-removable addressing mechanism in the base unit of a device. In these systems, should a base unit need to be replaced, a service technician would have to set the address for the replacement base unit, and there is a chance that the technician might make a mistake, thus costing time and energy to trace where the error lies. Further, the base unit may be placed on a ceiling or high up on a wall, thus causing difficulty for the technician to change an address when necessary. Unlike the aforementioned systems, the removable addressing mechanism according to the present aspects allows for an installer to remove the addressing mechanism from the base unit, move to a convenient location, configure or re-configure the addressing mechanism to a certain device address, and then plug the configured or re-configured addressing mechanism back into the base unit that is located on a ceiling or high up on a wall. For example, in some non-limiting aspects, the addressing mechanism may be implemented using a removable address “pennant” on which the address can be configured away from the base unit (for example, while the installer/technician is standing on the floor rather than on a ladder and reaching overhead), and thereafter the configured address pennant is pluggable into the base unit.

Turning now to the figures, example aspects are depicted with reference to one or more components described herein, where components in dashed lines may be optional.

Referring to FIG. 1, an addressable device 100 includes a base unit 104 and a device head 102 removably mountable onto the base unit 104. The addressable device 100 may be, for example, an emergency alarm system peripheral such as a hazard detector (including but not limited to a smoke, heat, carbon monoxide (CO), carbon dioxide (CO2), flame, natural gas, or another toxic or noxious chemical detector, a pull station, etc.), an intrusion detector (including but not limited to window and door contacts, glass break sensors, water or water level sensors, passive infra-red (IR) detectors, etc.), or a notification appliance (including but not limited to sirens, voice alerts, strobes, etc.). The base unit 104 may be mounted on a wall or ceiling, for example, in front of an electrical box. The device head 102, which houses the actual sensor(s), notification transponder(s), etc. of the addressable device 100, is attached to the base unit 104 during installation or replacement of the addressable device 100.

While some aspects below may be directed to smoke detectors, the present aspects are not so limited and are applicable to other systems where addressable devices are fixed to building walls or ceiling or other structures, for example, but not limited to, notification appliances or other emergency detectors or annunciators, home automation devices, etc. In some aspects, the terms "device head," "detector head," and "sensor head" may refer to the transponder part of a notification appliance device that can attach to a base unit of the device.

The base unit 104 of the addressable device 100 includes a removable non-electronic addressing mechanism 108 for setting an address for the addressable device 100. An optical address detection mechanism 106 in the device head 102 is configured to "see" the address configured in the removable non-electronic addressing mechanism 108 in the base unit 104. There are no electronics in the base unit 104.

In the non-limiting example aspect illustrated in FIG. 1, the removable non-electronic addressing mechanism 108 is implemented using a removable non-electronic switch array. However, the present aspects are not so limited, and the removable non-electronic addressing mechanism 108 may alternatively be implemented using a removable address pennant including knock-outs for setting an address, a removable tag (e.g., a paper or plastic tag) including a row of boxes on which an address may be marked (e.g., using a black marker), etc., as described with reference to various aspects below.

In one non-limiting aspect, for example, the optical address detection mechanism 106 in the device head 102 may include an array of light-emitting diodes (LEDs which may be visible or IR) and a corresponding array of optical sensors/receivers. The optical address detection mechanism 106 is align-able with the removable non-electronic addressing mechanism 108 in the base unit 104 so that, when properly aligned, the optical address detection mechanism 106 in the device head may "see" the address configured in the removable non-electronic addressing mechanism 108 in the base unit 104. In one non-limiting aspect, for example, the optical address detection mechanism includes multiple LED/optical sensor pairs, and each LED/optical sensor pair is configured for aligning with and optically reading one address bit configured on the removable non-electronic addressing mechanism 108 in the base unit 104.

More specifically, for example, the LED in an LED/optical sensor pair is configured for aligning with and illuminating an address bit configured on the non-electronic addressing mechanism 108 in the base unit 104, and the optical sensor in the LED/optical sensor pair is configured for determining whether light generated by the LED to illuminate the address bit is reflected back toward the optical sensor by the address bit. In an aspect, for example, the optical sensor may be configured to read an address bit of "1" if the amount of light reflected back is above a threshold, and to read an address bit of "0" if the amount of light reflected back is below a threshold, or vice versa. Further details of the operation of the optical address detection mechanism 106 are described below with reference to various non-limiting example aspects.

Referring to FIG. 1 in conjunction with FIGS. 2A-2D, for example, in some non-limiting aspects, the non-electronic addressing mechanism 108 in the base unit 104 may be implemented using a non-electronic switch array 200. The non-electronic switch array 200 includes a base portion 204 that is pluggable into the base unit 104 and multiple slide-able button portions 202 that are pluggable onto the base portion 204 to form the non-electronic switch array 200. In one aspect, the non-electronic switch array 200 may be made entirely of plastic.

Each slide-able button portion 202, when mounted onto the base portion 204, is slide-able between an "ON" position and an "OFF" position. In an aspect, for example, the "ON" position may represent an address bit of "1," and the "OFF" position may represent an address bit of "0," or vice versa. In some aspects, bumps and dents may be configured in the non-electronic switch array 200 to latch each slide-able button portion 202 into one of the two positions. The optical address detection mechanism 106 in the device head 102 includes an optical transmitter/receiver system configured to determine the status of each slide-able button portions 202 (e.g., whether each slide-able button portion 202 is in an "ON" position or in an "OFF" position). Each slide-able button portion 202 may represent a designated position in the non-electronic addressing mechanism 108 and is configurable into a first state having a first reflectivity level or a second state having a second reflectivity level. For example, each slide-able button portion 202, depending on whether configured in an "ON" position or an "OFF" position, either acts as a mirror/reflector and reflects light from an LED back to an associated optical sensor in the optical address detection mechanism 106, or deflects light so that the associated optical sensor in the optical address detection mechanism 106 does not detect any light (or only detects an insufficient amount of light).

Figure 3A:
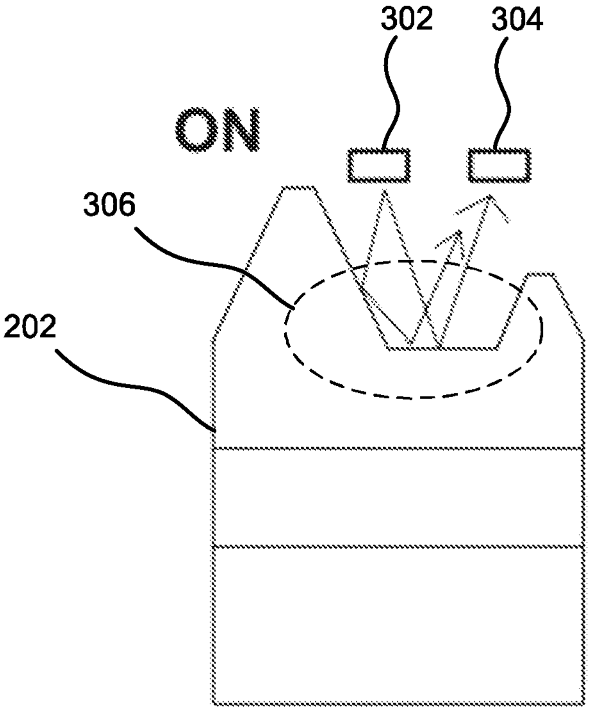
FIG. 3A is a first example side view of one slide-able button portion of a switch array implementing the optically readable addressing mechanism in FIG. 1 when the slide-able button portion is configured in a reflective or "ON" state, according to some aspects.
Figure 3B:
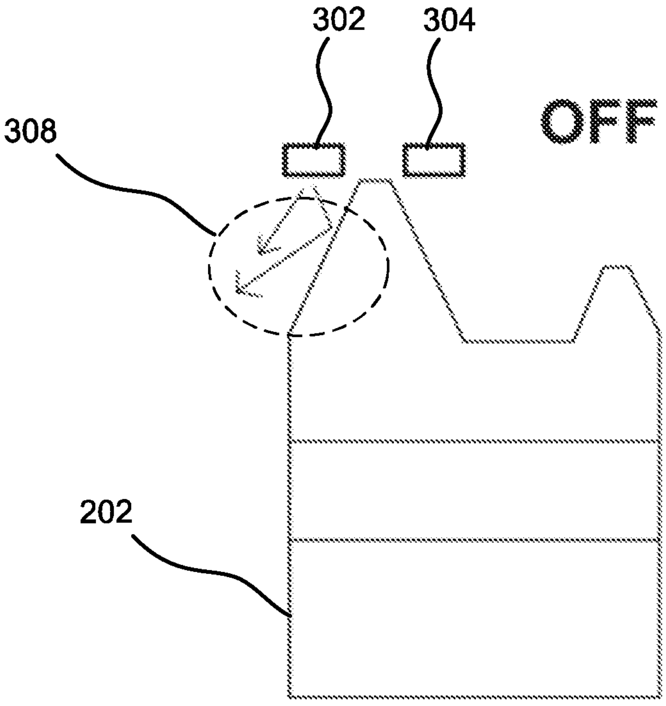
FIG. 3B is a second example side view of one slide-able button portion of a switch array implementing the optically readable addressing mechanism in FIG. 1 when the slide-able button portion is configured in a non-reflective or "OFF" state, according to some aspects.

For example, referring to FIGS. 3A and 3B, for each slide-able button portion 202 in the non-electronic switch array 200, an LED 302 in the optical address detection mechanism 106 may be configured to radiate light toward that slide-able button portion 202. The slide-able button portion 202 may be configured such that, when the slide-able button portion 202 is in an "ON" position, a first portion 306 of the slide-able button portion 202 reflects the light from the LED 302 back to an optical sensor 304 in the optical address detection mechanism 106. Further, when the slide-able button portion 202 is in an "OFF" position, a second portion 308 of the slide-able button portion 202 reflects the light from the LED 302 away from the optical sensor 304 in the optical address detection mechanism 106.

However, the present aspects are not so limited. For example, in some alternative aspects, the "ON" and "OFF" positions illustrated in FIGS. 3A and 3B may be reversed so that FIG. 3A represents the "OFF" position of the slide-able button portion 202 and FIG. 3B represents the "ON" position of the slide-able button portion 202. Accordingly, the slide-able button portion 202 reflects the light from the LED 302 back to the optical sensor 304 when the slide-able button portion 202 is in an "OFF" position, and reflects the light from the LED 302 away from the optical sensor 304 when the slide-able button portion 202 is in an "ON" position.

Referring to FIGS. 4A-4E, in some example alternative low-cost aspects, a removable address pennant 402 may be used to implement an addressing mechanism in the base unit 104. In these aspects, if the base unit 104 needs to be replaced, a technician may only need to remove the address pennant 402 from an old base unit and then insert the address pennant 402 into the new base unit, thus ensuring that the address does not change. For example, attempting to match the address using a new address pennant can lead to a mistake(s). Also, since the address pennant 402 is removable from and pluggable into the base unit 104, a technician may set the address on the address pennant 402 and then insert the address pennant 402 into the base unit 104. In an aspect, once inserted into a receiving portion 404 of the base unit 104 (which may be a slot in the base unit 104), the address pennant 402 locks into the base unit 104. In an aspect, for example, the address pennant 402 may lock into the base unit 104 when a tab 406 (or latch) configured in the receiving portion 404 of the base unit 104 engages into a corresponding slot 408 configured on the address pennant 402. Such locking may also improve the accuracy in reading the address configured on the address pennant 402 by better securing the address pennant 402 in the appropriate location for reading.

The address pennant 402 in the base unit 104 includes multiple configurable positions 410 arranged as a knock-out array 416. Each configurable position 410 represents an address bit and is configurable into one of two states by either leaving a knock-out 412 in the configurable position 410 or by removing the knock-out 412 from the configurable position 410. Accordingly, each configurable position 410 is configurable into a first state having a first reflectivity level or a second state having a second reflectivity level. Each knock-out 412 is removable by breaking along corresponding perforations 414 configured in the address pennant 402. In one non-limiting aspect, before the address pennant 402 is configured for the first time, all of the knock-outs 412 in the knock-out array 416 are in place. Subsequently, an installer may knock out one or more of the knock-outs 412 to set a desired address in the address pennant 402. For example, in an aspect, each intact knock-out may represent an address bit of "1," and each removed knock-out may represent an address bit of "0," or vice versa. In an aspect, once inserted into the receiving portion 404 of the base unit 104 (e.g., a slot in the base unit 104), the knock-out array 416 is aligned over a cut-out 418 configured in the base unit 104 to allow for optical address detection as described below with reference to various example aspects in FIGS. 5A-5D.

Figure 4A:
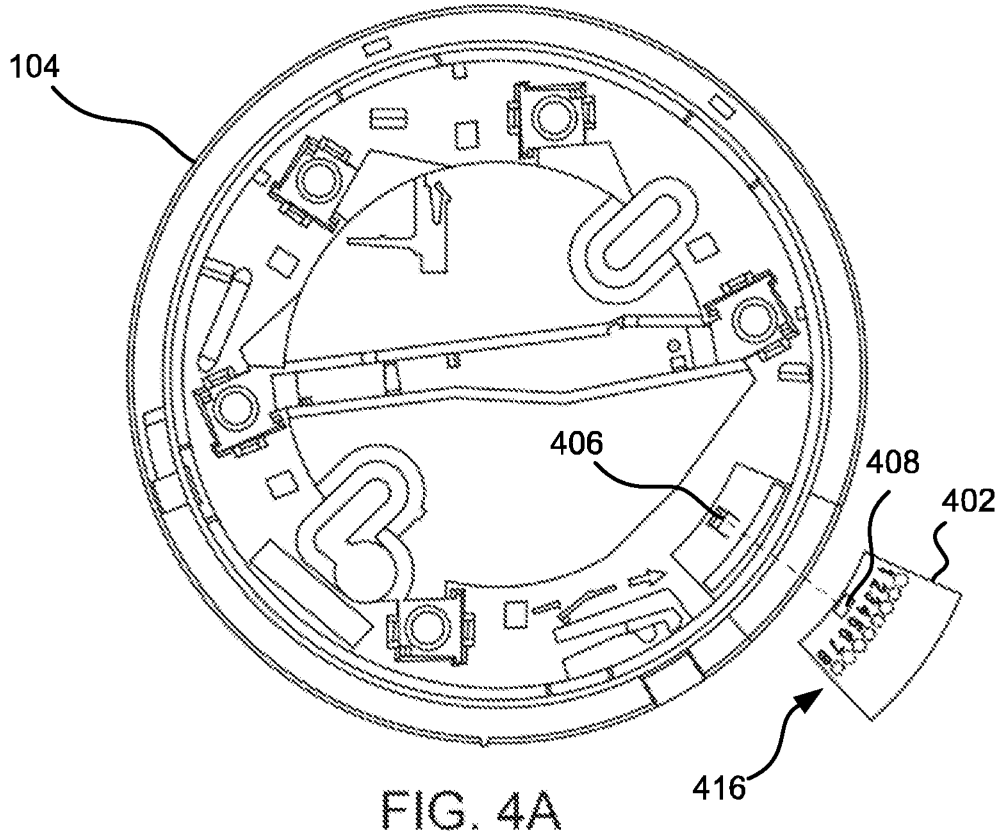
FIG. 4A is an example addressable device base unit including a receiving portion configured for receiving a removable address pennant, according to some aspects.
Figure 4B:
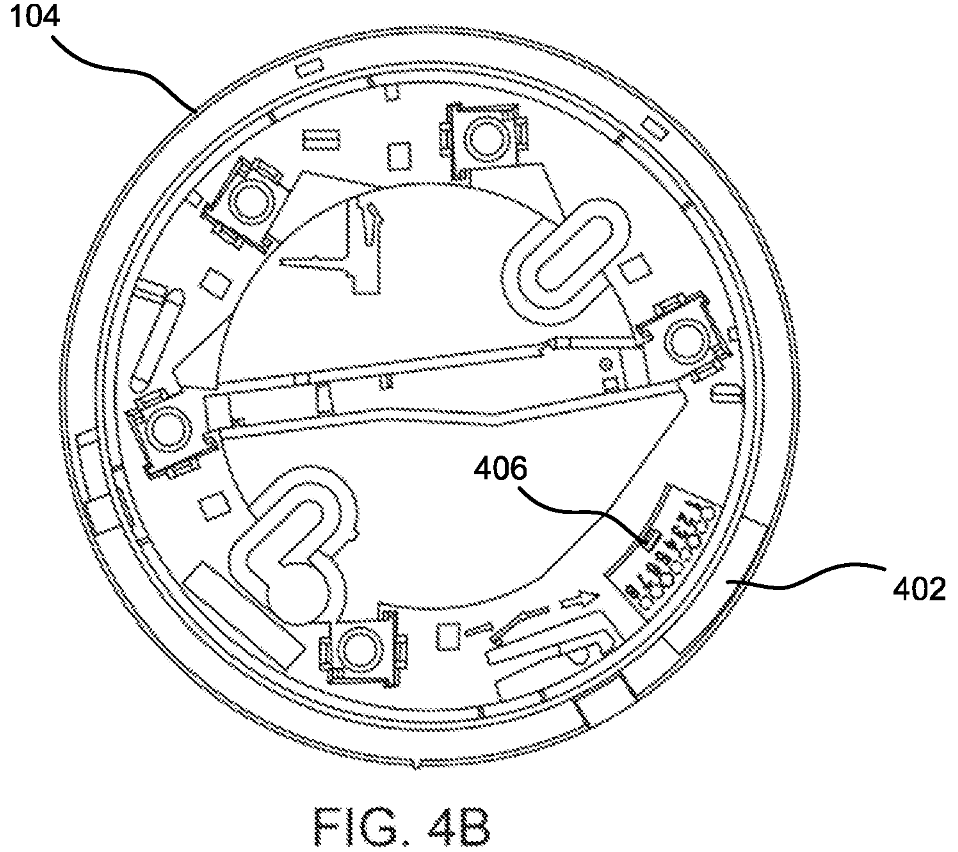
FIG. 4B is the example addressable device base unit of FIG. 4A with the removable address pennant inserted into the receiving portion of the base unit, according to some aspects.
Figure 4C:
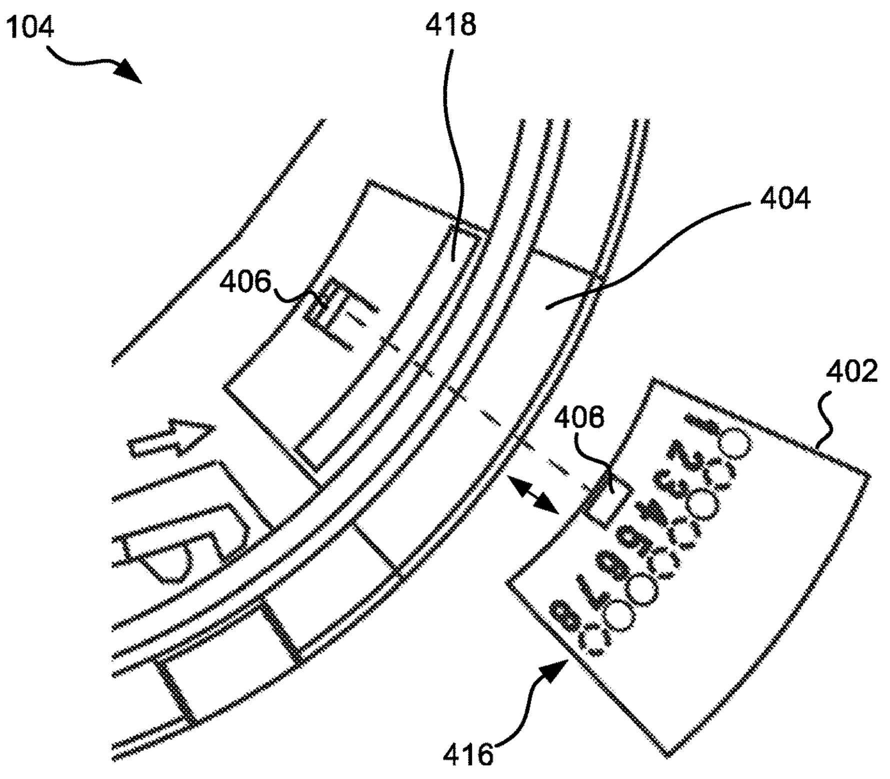
FIG. 4C is a magnified view of the receiving portion of the example addressable device base unit of FIG. 4A, according to some aspects.
Figure 4D:
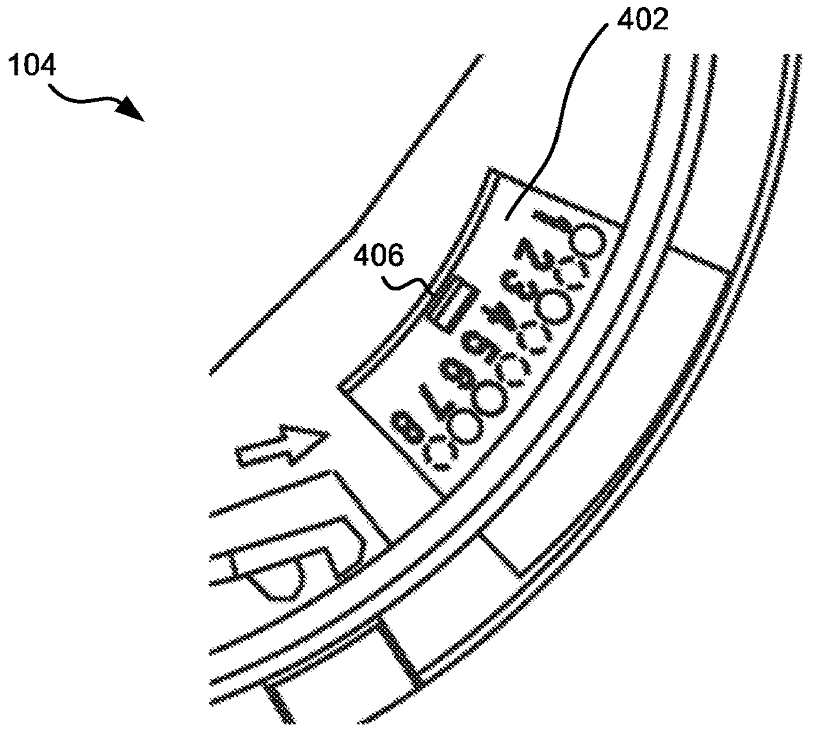
FIG. 4D is a magnified view of the receiving portion of the example addressable device base unit of FIG. 4B with the removable address pennant inserted into the receiving portion of the base unit, according to some aspects.
Figure 4E:
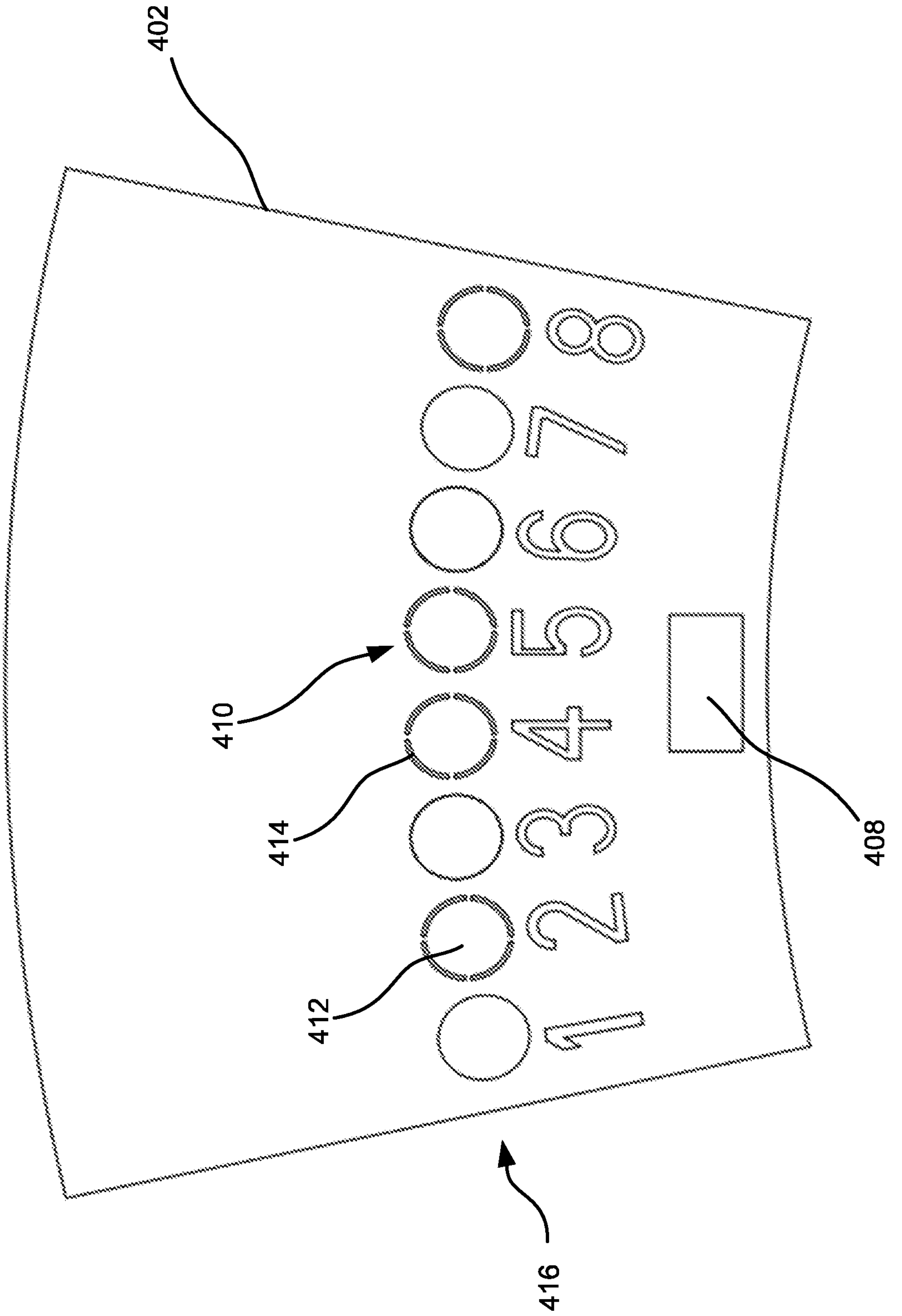
FIG. 4E is a magnified view of the example removable address pennant of FIGS. 4A and 4D having eight knock-out positions that each represents one bit of an 8-bit address, according to some aspects.

In one non-limiting aspect, for example, referring to FIG. 4E, the knock-out array 416 in the address pennant 402 includes eight configurable positions 410, where each configurable position 410 represents one bit of an 8-bit address. The knock-outs 412 have been removed at positions 1, 3, 6, and 7, which may be associated with the pattern: "ON, OFF, ON, OFF, OFF, ON, ON, OFF," which when the order is reversed and converted to binary, represents an 8-bit binary address of 01100101, or equivalently a decimal address of 101. Accordingly, the address on the address pennant 402 has been set to 101, and if the address pennant 402 is inserted into a base unit of an addressable device, the addressable device is identifiable by the address of 101.

Referring to FIGS. 5A-5D, in some example aspects, the optical address detection mechanism 106 in the device head 102 of the addressable device 100 may include an optical transmitter/receiver system configured to determine the status of each knock-out 412 (e.g., whether each knock-out 412 is removed or not removed) in the address pennant 402. The address pennant 402 may be set to a desired address by an installer/technician, and then inserted into the base unit 104. In some aspects, the addressable device 100 may be configured such that the device head 102 can only be mounted onto the base unit 104 in one "fool-proof" way so as to ensure proper alignment of the optical address detection mechanism 106 with the address pennant 402 for optically reading the address configured on the address pennant 402. Each address bit configured in the address pennant 402 may either reflect or not reflect light from the optical address detection mechanism 106 to allow for "optical addressing." This allows for low-cost addressing and no mechanical switches are needed. Further, because the address pennant 402 is relatively inexpensive, additional address pennants 402 can be provided in case wrong knock-outs have erroneously been removed.

The address pennant 402 may be configured over an opening 510 of a cavity 502 (e.g., a hole) configured in the base unit 104. In some aspects, the opening 510 of the cavity 502 may be defined by the cut-out 418 described above with reference to FIG. 4C. For each knock-out 412 in the addressing mechanism, an LED 302 in the optical address detection mechanism 106 may be configured to illuminate the position of the knock-out 412 on the address pennant 402. When the knock-out 412 is not removed (FIG. 5A), the light is reflected back from the LED 302 to a corresponding optical sensor 304 in the optical address detection mechanism 106 by the knock-out 412. when the knock-out 412 is removed (FIGS. 5B-5D), the light from the LED 302 is not reflected back to the optical sensor 304 in the address detection mechanism. Accordingly, each knock-out 412 that is not removed may represent an "ON" position, while each knock-out 412 that is removed may represent an "OFF" position, or vice versa.

Figure 5A:
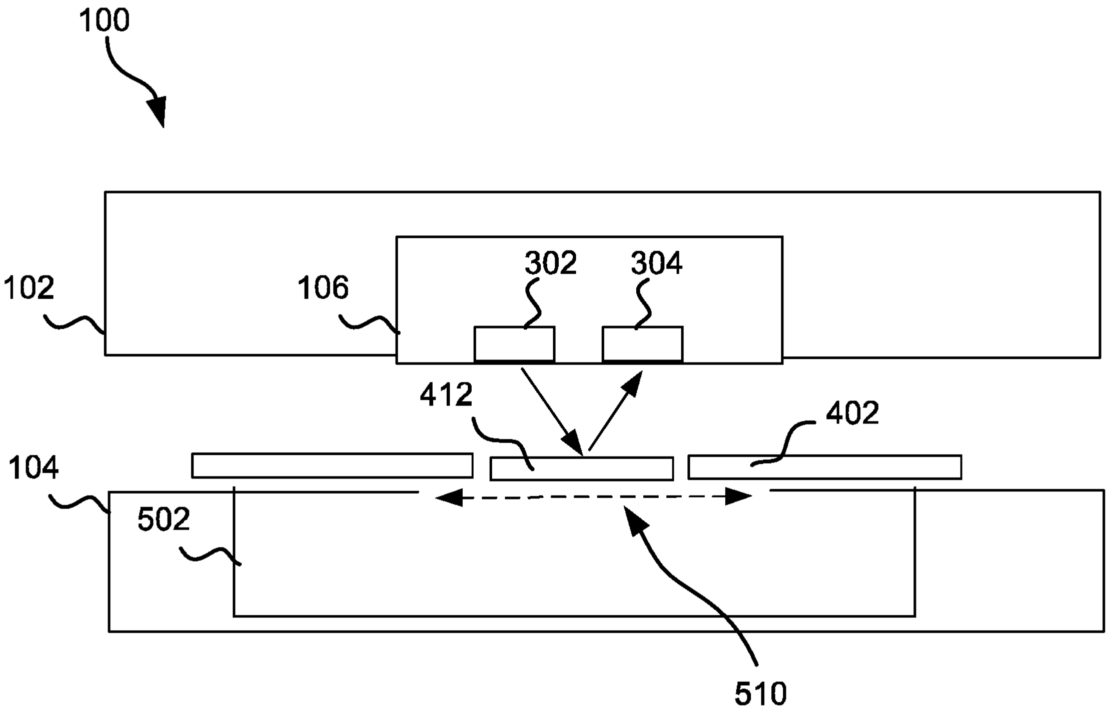
FIG. 5A is a first example cavity configured in the base unit of an addressable device for supporting a removable address pennant thereon, according to some aspects.
Figure 5B:
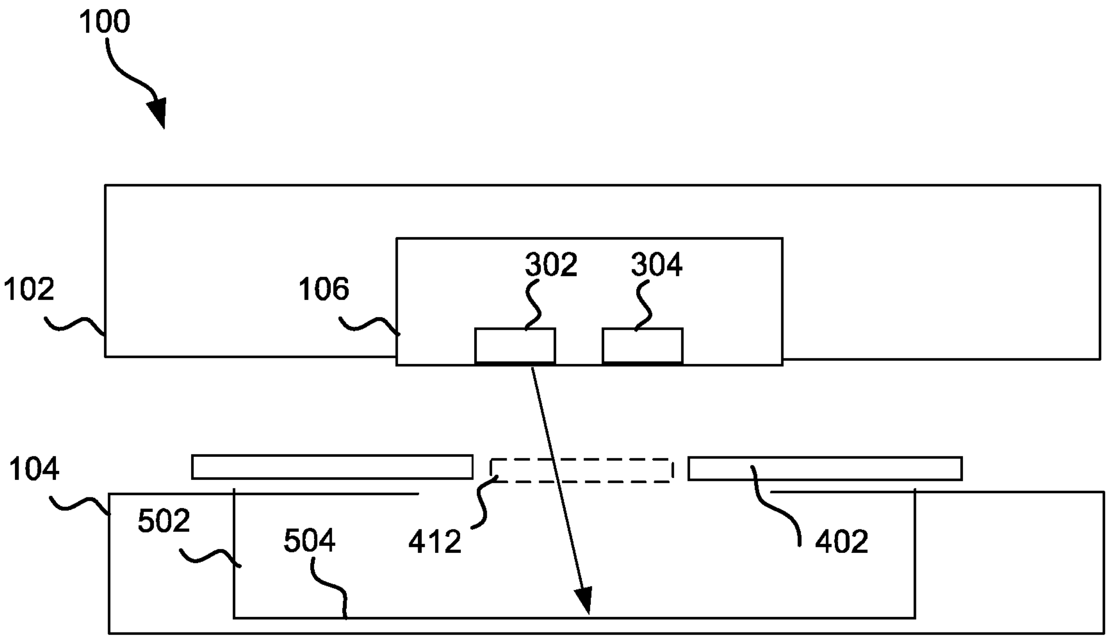
FIG. 5B is the first example cavity of FIG. 5A having an interior surface that absorbs or diffuses light that enters the cavity, according to some aspects.

For example, in one non-limiting aspect, referring to FIG. 5B, when the knock-out 412 is removed, light radiated by the LED 302 toward the position of the knock-out 412 passes through the opening 510 and into the cavity 502, and the light is then dissipated within the cavity 502 or is otherwise reflected in a way that is mostly absorbed or dissipated within the cavity 502. In one non-limiting aspect, for example, a non-reflective or substantially non-reflective surface 504 (e.g., a surface that is painted black) may be configured inside the cavity 502 to receive and substantially absorb the any incident light.

Figure 5C:
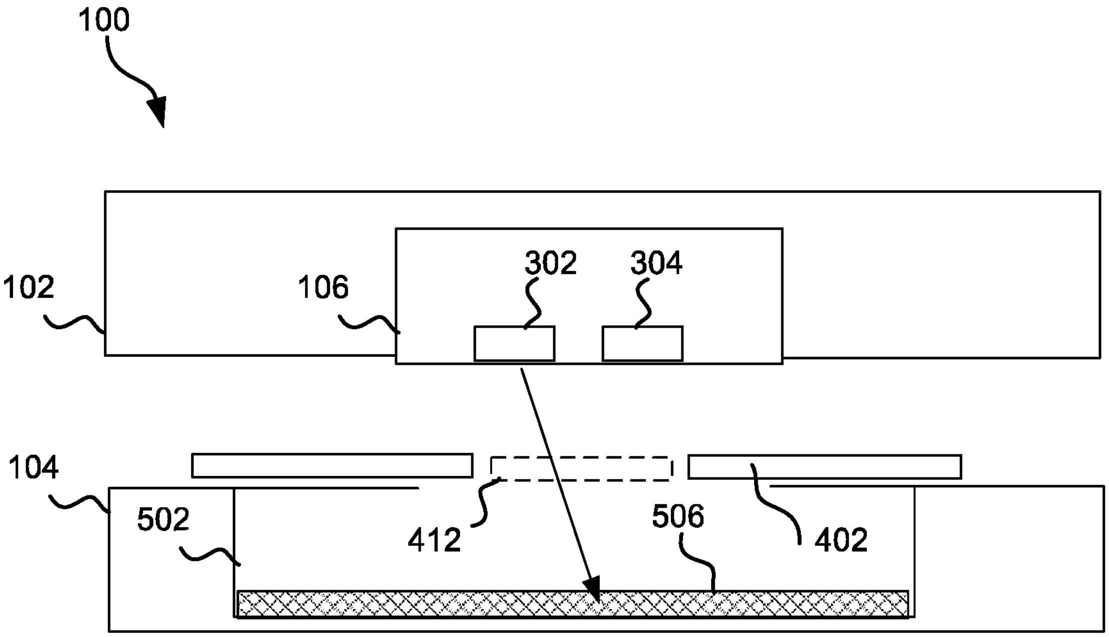
FIG. 5C is a second example cavity configured in the base unit of an addressable device and including an interior surface covered with a light diffusing layer to diffuse light that enters the cavity, according to some aspects.

In another non-limiting aspect, for example, referring to FIG. 5C, a non-reflective or substantially non-reflective layer 506 may be configured inside the cavity 502 to receive and diffuse any incident light. In some aspects, for example, the non-reflective or substantially non-reflective layer 506 may be made of a porous rubber or plastic material. In some aspect, for example, the non-reflective or substantially non-reflective layer 506 may include many V-shaped structures that reflect the light that enters the cavity 502 in such a way that the reflected light "bounces around" within the cavity 502 and is substantially attenuated within the cavity 502 before exiting the opening 510 of the cavity 502.

Figure 5D:
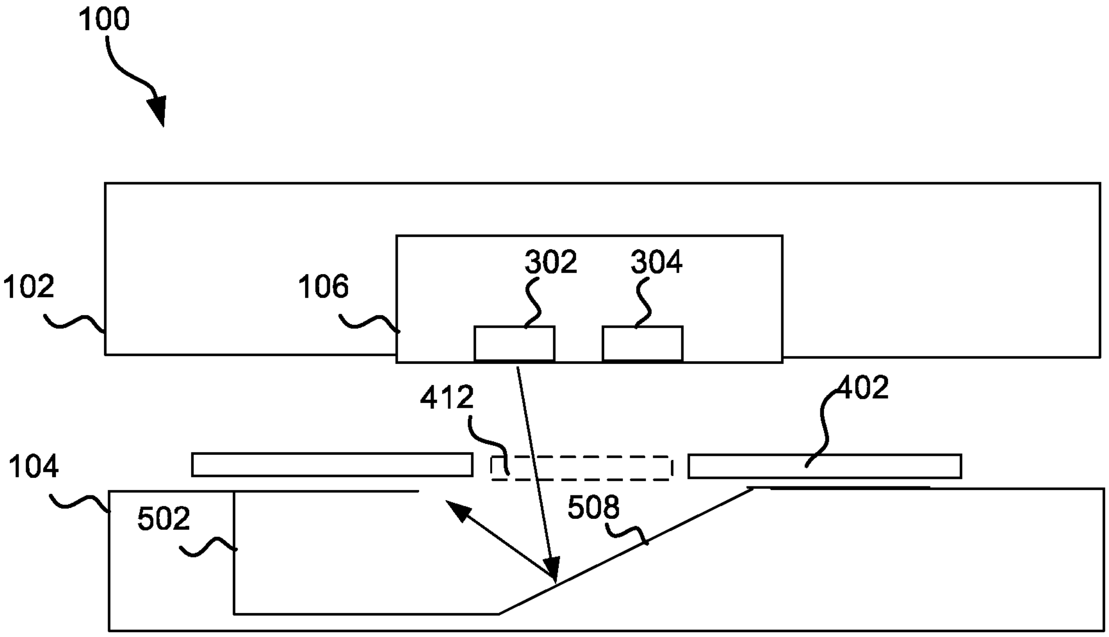
FIG. 5D is a third example cavity configured in the base unit of an addressable device and including an angled interior surface that reflects light away from a hole through which the light enters the cavity, according to some aspects.

In another non-limiting aspect, for example, referring to FIG. 5D, an angled surface 508 may be configured inside the cavity 502 to receive the light and reflect the light in a certain direction such that the reflected light does not exit the opening 510 of the cavity 502 back toward the optical sensor 304.

In some aspects, the cavity 502 may also be configured to prevent dust or other particles or environmental contaminants from getting through the base unit 104.

Although the above example aspects of the address pennant 402 are described with reference to the base unit 104 that includes the cavity 502, the present aspects are not so limited.

For example, in some alternative non-limiting aspects, the base unit 104 may not include the cavity 502, in which case the address pennant 402 may instead be configured over a non-reflective or substantially non-reflective surface (e.g., a black surface) on the base unit 104. For each knock-out in the address pennant 402, an LED in the optical address detection mechanism 106 may be configured to radiate light toward the position of the knock-out. The light is reflected back to an optical sensor in the optical address detection mechanism 106 by the knock-out when the knock-out is not removed. Alternatively, when a knock-out is removed, any light radiated by the LED toward the position of the knock-out passes through the hole left by the removed knock-out and is mostly absorbed by the black surface under the hole.

In yet another alternative non-limiting aspects, the address pennant 402 including the knock-out array 416 may have a non-reflective or substantially non-reflective surface (e.g., a black surface), and may be configured over a reflective surface (e.g., a white surface) on the base unit 104. For each knock-out in the address pennant 402, an LED in the optical address detection mechanism 106 may be configured to radiate light toward the position of the knock-out. If the knock-out is removed, the light is reflected back to an optical sensor in the optical address detection mechanism 106 by the reflective surface exposed through a hole left by the removed knock-out. If the knock-out is not removed, any light radiated by the LED toward the knock-out is mostly absorbed by the black surface of the knock-out.

Alternatively, in some aspects, the removable non-electronic addressing mechanism 108 in the base unit 104 may be implemented using a tag (e.g., a paper or plastic tag) including a row of boxes on which an address may be marked (e.g., using a black marker). In these aspects, the optical address detection mechanism 106 in the device head 102 may include an optical transmitter/receiver system configured to determine the status of each box on the tag (e.g., whether each box is marked or unmarked). For example, for each box on the tag, an LED in the optical address detection mechanism 106 may be configured to radiate light toward the box. The light is reflected back to an optical sensor in the optical address detection mechanism 106 by the box when the box is not marked, and is not reflected back to the optical sensor in the optical address detection mechanism 106 when the box is marked (e.g., the box is marked using a black marker and is therefore not reflective or minimally reflective).

In another alternative aspect, the removable non-electronic addressing mechanism 108 in the base unit 104 may be implemented using a tag including a row of white boxes covered with a peel-able layer, and the optical address detection mechanism 106 in the device head 102 may include an optical transmitter/receiver system configured to determine the status of each box on the tag (e.g., whether the peel-able layer on each box is peeled away or not). In an aspect, for example, the peel-able layer may be made of creased aluminum foil, and any light directed toward the creased aluminum foil is scattered away. For each box on the tag, an LED in the optical address detection mechanism 106 may be configured to radiate light toward the box. The light is reflected back to an optical sensor in the optical address detection mechanism 106 by the box when the peel-able layer on the box is peeled away, and is not reflected back to the optical sensor in the optical address detection mechanism 106 when the peel-able layer on the box is left thereon.

In yet another alternative aspect, the removable non-electronic addressing mechanism 108 in the base unit 104 may be implemented using a tag including a row of black boxes covered with a peel-able layer, and the optical address detection mechanism 106 in the device head 102 may include an optical transmitter/receiver system configured to determine the status of each box on the tag (e.g., whether the peel-able layer on each box is peeled away or not). In an aspect, for example, the peel-able layer may be made of smooth reflective aluminum foil. For each box on the tag, an LED in the optical address detection mechanism 106 may be configured to radiate light toward the box. The light is reflected back to an optical sensor in the optical address detection mechanism 106 by the smooth aluminum foil on the box when the smooth aluminum foil on the box is not peeled away and is left intact thereon. The light is absorbed by the black box and is not reflected back to the optical sensor in the optical address detection mechanism 106 when the aluminum foil on the box is peeled away.

In a further alternative aspect, the removable non-electronic addressing mechanism 108 in the base unit 104 may be implemented using a tag including a row of boxes that each can be covered by a sticker, and the optical address detection mechanism 106 in the device head 102 may include an optical transmitter/receiver system configured to determine the status of each box on the tag (e.g., whether or not the box is covered by a sticker). In an aspect, for example, the boxes may be white and the stickers may be black. For each box on the tag, an LED in the optical address detection mechanism 106 may be configured to radiate light toward the box. When the white box is not covered by a black sticker, the light is reflected back to an optical sensor in the optical address detection mechanism 106 by the white box. When the white box is covered by a black sticker, the light is absorbed by the black sticker and is not reflected back to the optical sensor in the optical address detection mechanism 106.

In another alternative aspect, the boxes may be black and the stickers may be white. For each box on the tag, an LED in the optical address detection mechanism 106 may be configured to radiate light toward the box. When the black box is covered by a white sticker, the light is reflected back to an optical sensor in the optical address detection mechanism 106 by the white sticker. When the black box is not covered by a white sticker, the light is absorbed by the black box and is not reflected back to the optical sensor in the optical address detection mechanism 106.

In some non-limiting aspects, the optical address detection mechanism 106 in the device head 102 may include an IR transmitter/receiver system. In these aspects, the removable non-electronic addressing mechanism 108 in the base unit 104 may include the address pennant 402 configured over the cavity 502 and including the knock-out array 416. Each knock-out 412 reflects IR radiation when the knock-out 412 is not removed. When the knock-out 412 is removed, the IR radiation passes through a hole left by the removed knock-out and gets dissipated within the cavity 502.

Alternatively, the removable non-electronic addressing mechanism 108 in the base unit 104 may include a white plastic tag with a row of boxes, where each box reflects IR radiation when the box is not marked, and does not reflect the IR radiation when the box is marked with black paint.

In another alternative aspect, an address detection mechanism in the device head 102 may include a sonar transmitter/receiver system, and the removable non-electronic addressing mechanism 108 in the base unit 104 may include the address pennant 402 configured over the cavity 502 and including the knock-out array 416. Each knock-out 412 reflects a received sonar signal when the knock-out 412 is not removed. When the knock-out 412 is removed, the sonar signal passes through a hole left by the removed knock-out and get dissipated within the cavity 502. For example, the interior surface of the cavity 502 may be covered with a soft rubber material that absorbs/diffuses any sonar signal that enters the cavity 502.

Alternatively, the removable non-electronic addressing mechanism 108 in the base unit 104 may include a tag with a row of boxes, where each box may have either a hard surface that reflects a received sonar signal, or a soft surface that absorbs a received sonar signal. For example, the tag may be made of rubber that absorbs a received sonar signal, in which case each box may be covered by a solid metal sticker to reflect a received sonar signal. Alternatively, the tag may be made of a solid metal that reflects a received sonar signal, in which case each box may be covered by a soft plastic sticker that absorbs a received sonar signal.

In another alternative aspect, an address detection mechanism in the device head 102 may include a radio-frequency (RF) transmitter/receiver system, and the removable non-electronic addressing mechanism 108 in the base unit 104 may include the address pennant 402 configured over the cavity 502 and including the knock-out array 416. Each knock-out 412 reflects a received RF signal when the knock-out 412 is not removed. When the knock-out 412 is removed, the RF signal passes through a hole left by the removed knock-out and get dissipated within the cavity 502. For example, the interior surface of the cavity 502 may be covered with an RF-absorbing material such as an RF-absorbing polymer or iron ball paint that absorbs RF signal that enters the cavity 502.

Alternatively, the removable non-electronic addressing mechanism 108 in the base unit 104 may include a tag with a row of boxes, where each box may have either a hard surface that reflects a received RF signal, or a soft surface that absorbs a received RF signal. For example, the tag may be made of an RF-absorbing polymer or may be covered with iron ball paint that absorbs a received RF signal, in which case each box may be covered by a solid metal sticker to reflect a received RF signal. Alternatively, the tag may be made of a solid metal that reflects a received RF signal, in which case each box may be covered by an RF-absorbing polymer sticker or by iron ball paint that absorbs a received RF signal.

In yet another alternative aspect, an address detection mechanism in the device head 102 may include an RF identification (RFID) system, and the removable non-electronic addressing mechanism 108 in the base unit 104 may include an address pennant. In one non-limiting aspect, for example, in order to configure an address for the addressable device 100, a removable RFID tag or sticker may be placed on the address pennant, and the address pennant may then be inserted into the base unit 104 of the addressable device 100.

The present aspects allow for a removable and configurable addressing mechanism (e.g., a removable and configurable address switch, pennant, tag, etc.) to be implemented as a common part that can be shipped to various job sites and can be configured/replaced in the field. In particular, for example, a removable and configurable address pennant or tag according to some present aspects provides a low cost addressing mechanism which does not require assembly and can be configured/replaced in the field. In an aspect, for example, the removable and configurable address pennant or tag can be quickly and readily configured/replaced in the field with minimal complexity.

Although the above aspects are described with reference to a binary detection mechanism (e.g., whether a switch is "ON" or "OFF," whether a box is checked or not, etc.), the present aspects are not so limited. For example, in various alternative aspects, an address detection mechanism in a device head may be configured to detect which one of three or more states is configured for each address digit of the addressing mechanism in the base unit. For example, in one non-limiting aspect where the addressing mechanism is implemented using a tag including a row of mark-able boxes, the address detection mechanism in the device head may include an optical transmitter/receiver capable of detecting which one of a multitude of colors the box is marked with (e.g., whether the box is marked black, white, red, etc.).

In some aspects where the removable non-electronic addressing mechanism 108 in the base unit 104 includes the address pennant 402 including the knock-out array 416, each knock-out 412 may be removable by breaking along corresponding perforations 414 configured in the address pennant 402. For example, each knock-out 412 may be configured as a circular disk in the address pennant 402, where the circular disk has a perforated perimeter and is removable from the address pennant 402 by applying sufficient pressure to the circular disk to break the perforations 414. However, the present aspects are not so limited, and the address pennant 402 according to some alternative aspects may not include any removable knock-outs 412. Instead, each address pennant may be pre-configured with an address, in which case an installer may select an address pennant pre-configured with a certain address and then insert that address pennant into the base unit of a device.

Figure 6:
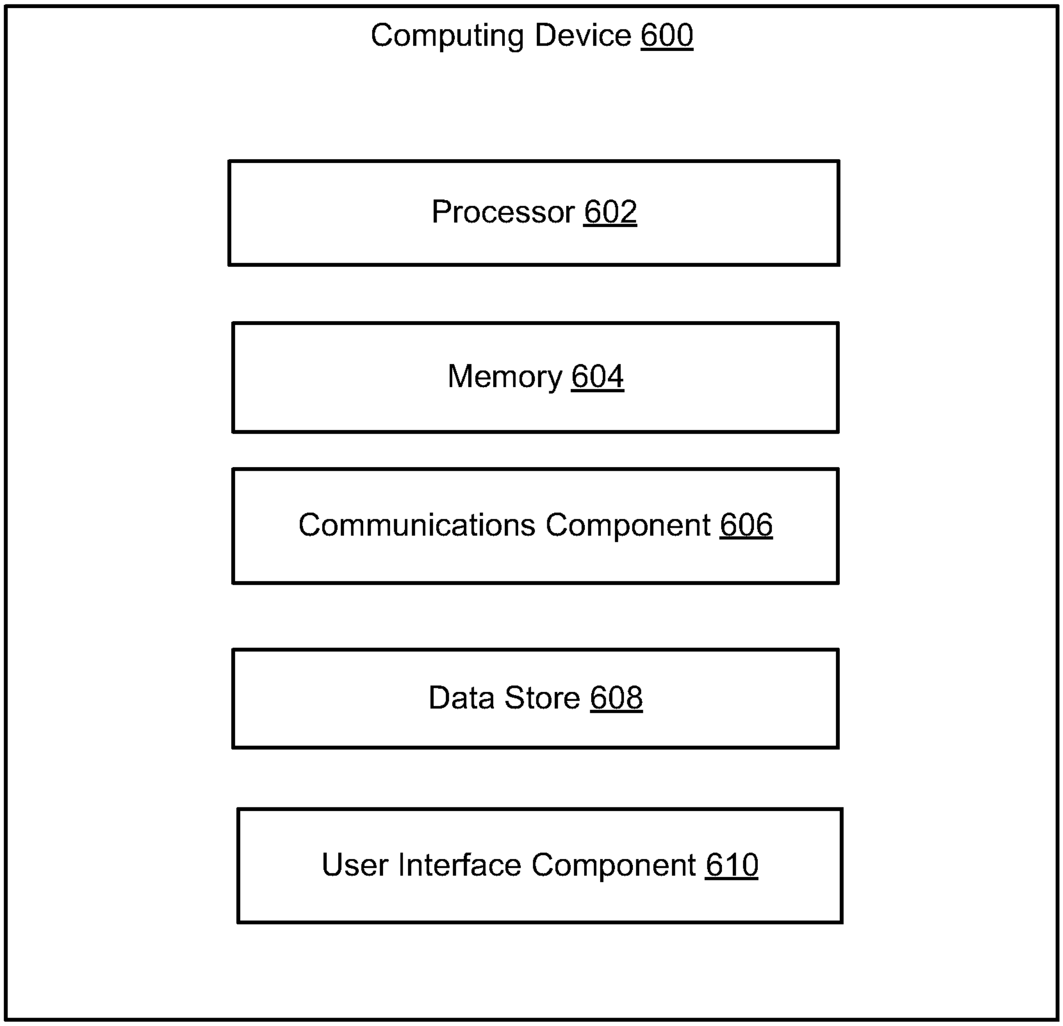
FIG. 6 is a block diagram of an example computing device which may implement all or a portion of an addressable device, according to some aspects.

FIG. 6 illustrates an example block diagram providing details of computing components in a computing device 600 that may implement all or a portion of one or more components in an addressable device or any other component described above. The computing device 600 includes a processor 602 which may be configured to execute or implement software, hardware, and/or firmware modules that perform any functionality described above with reference to one or more components in an addressable device.

The processor 602 may be a micro-controller and/or may include a single or multiple set of processors or multi-core processors. Moreover, the processor 602 may be implemented as an integrated processing system and/or a distributed processing system. The computing device 600 may further include a memory 604, such as for storing local versions of applications being executed by the processor 602, related instructions, parameters, etc. The memory 604 may include a type of memory usable by a computer, such as random access memory (RAM), read only memory (ROM), tapes, flash drives, magnetic discs, optical discs, volatile memory, non-volatile memory, and any combination thereof. Additionally, the processor 602 and the memory 604 may include and execute an operating system executing on the processor 602, one or more applications, display drivers, etc., and/or other components of the computing device 600.

Further, the computing device 600 may include a communications component 606 that provides for establishing and maintaining communications with one or more other devices, parties, entities, etc., utilizing hardware, software, and services. The communications component 606 may carry communications between components on the computing device 600, as well as between the computing device 600 and external devices, such as devices located across a communications network and/or devices serially or locally connected to the computing device 600. For example, the communications component 606 may include one or more buses, and may further include transmit chain components and receive chain components associated with a wireless or wired transmitter and receiver, respectively, operable for interfacing with external devices.

Additionally, the computing device 600 may include a data store 608, which can be any suitable combination of hardware and/or software, that provides for mass storage of information, databases, and programs. For example, the data store 608 may be or may include a data repository for applications and/or related parameters not currently being executed by the processor 602. In addition, the data store 608 may be a data repository for an operating system, application, display driver, etc., executing on the processor 602, and/or one or more other components of the computing device 600.

The computing device 600 may also include a user interface component 610 operable to receive inputs from a user of the computing device 600 and further operable to generate outputs for presentation to the user (e.g., via a display interface to a display device). The user interface component 610 may include one or more input devices, including but not limited to a keyboard, a number pad, a mouse, a touch-sensitive display, a navigation key, a function key, a microphone, a voice recognition component, or any other mechanism capable of receiving an input from a user, or any combination thereof. Further, the user interface component 610 may include one or more output devices, including but not limited to a display interface, a speaker, a haptic feedback mechanism, a printer, any other mechanism capable of presenting an output to a user, or any combination thereof.

Some further example aspects are provided below.

1. An addressable device, comprising:

a base unit mountable on a structure;

a device head removably mountable onto the base unit;

wherein a removable addressing mechanism is removably mountable onto the base unit and is configured for setting an address for the addressable device;

wherein the device head includes an optical address detection mechanism that, when the device head and the removable addressing mechanism are mounted onto the base unit, is configured to align with the removable addressing mechanism to optically read the address configured in the removable addressing mechanism; and wherein the removable addressing mechanism is electrically isolated from the base unit, the device head, and the optical address detection mechanism.

2. The addressable device of clause 1, wherein the removable addressing mechanism comprises multiple designated positions for configuring the address thereon;

wherein each designated position in the removable addressing mechanism is configurable into at least a first state having a first reflectivity level or a second state having a second reflectivity level; and wherein the first reflectivity level of a designated position in the first state and the second reflectivity level of the designated position in the second state are distinctly detectable by the optical address detection mechanism when the device head and the removable addressing mechanism are mounted onto the base unit.

3. The addressable device of clause 2, wherein the removable addressing mechanism comprises an address pennant.

4. The addressable device of clause 3, wherein the address pennant comprises a plastic unit having a reflective surface.

5. The addressable device of clause 4, wherein each designated position comprises a knock-out defined by perforations configured on the reflective surface of the address pennant.

6. The addressable device of clause 3, wherein the base unit comprises a slot configured for insertion of the address pennant thereinto and for removal of the address pennant therefrom.

7. The addressable device of clause 3, wherein the designated position comprises a knock-out position;

wherein the designated position is configurable into the first state by leaving a knock-out in the designated position; and wherein the designated position is configurable into the second state by removing the knock-out from the designated position.

8. The addressable device of clause 3, wherein the base unit comprises a cut-out configured to allow light from the optical address detection mechanism in the device head to illuminate the address pennant when the device head and the removable addressing mechanism are mounted onto the base unit.

9. The addressable device of clause 3, wherein the base unit further comprises a cavity; and wherein the address pennant is mountable onto the base unit over the cavity.

10. The addressable device of clause 9, wherein the cavity is configured to absorb or diffuse at least a portion of light that is generated by the optical address detection mechanism and is entering the cavity through holes formed by removal of one or more knock-outs from the address pennant.

11. The addressable device of clause 10, wherein the cavity comprises an interior surface configured to absorb at least a portion of the light that enters the cavity.

12. The addressable device of clause 10, wherein the cavity comprises an interior angled surface configured to reflect the light away from a hole through which the light enters the cavity.

13. The addressable device of clause 9, wherein the base unit further comprises a cut-out configured to allow light from the optical address detection mechanism in the device head to illuminate the address pennant when the device head and the removable addressing mechanism are mounted onto the base unit; and wherein, when the device head and the removable addressing mechanism are mounted onto the base unit, the cavity is configured to prevent environmental particles from entering the device head through the cut-out.

14. A removable addressing mechanism comprising:

multiple designated positions for configuring an address for an addressable device;

wherein the removable addressing is removably mountable onto a base unit of the addressable device;

wherein the base unit is mountable on a structure;

wherein the addressable device further comprises a device head that is removably mountable onto the base unit;

wherein the device head includes an optical address detection mechanism that, when the device head and the removable addressing mechanism are mounted onto the base unit, is configured to align with the removable addressing mechanism to optically read the address configured in the removable addressing mechanism; and wherein the removable addressing mechanism is electrically isolated from the base unit, the device head, and the optical address detection mechanism.

15. The removable addressing mechanism of clause 14, wherein each designated position in the removable addressing mechanism is configurable into at least a first state having a first reflectivity level or a second state having a second reflectivity level; and wherein the first reflectivity level of a designated position in the first state and the second reflectivity level of the designated position in the second state are distinctly detectable by the optical address detection mechanism when the device head and the removable addressing mechanism are mounted onto the base unit.

16. The removable addressing mechanism of clause 15, wherein the removable addressing mechanism comprises an address pennant.

17. The removable addressing mechanism of clause 16, wherein the address pennant comprises a plastic unit having a reflective surface; and wherein each designated position comprises a knock-out defined by perforations configured on the reflective surface of the address pennant.

18. The removable addressing mechanism of clause 16, wherein the address pennant is insert-able into and removable from a slot configured in the base unit of the addressable device.

19. The removable addressing mechanism of clause 16, wherein the designated position comprises a knock-out position;

wherein the designated position is configurable into the first state by leaving a knock-out in the designated position; and wherein the designated position is configurable into the second state by removing the knock-out from the designated position.

20. A base unit of an addressable device, comprising:

a receiving portion configured for removably mounting a removable addressing mechanism thereonto;

wherein the removable addressing mechanism is configured for setting an address for the addressable device;

wherein the base unit is mountable on a structure;

wherein a device head of the addressable device is removably mountable onto the base unit;

wherein the device head includes an optical address detection mechanism that, when the device head and the removable addressing mechanism are mounted onto the base unit, is configured to align with the removable addressing mechanism to optically read the address configured in the removable addressing mechanism; and wherein the removable addressing mechanism is electrically isolated from the base unit, the device head, and the optical address detection mechanism.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. An addressable device, comprising:

a base unit mountable on a structure;

a device head removably mountable onto the base unit;

wherein a removable addressing mechanism is removably mountable onto the base unit and is configured for setting an address for the addressable device;

wherein the device head includes an optical address detection mechanism that, when the device head and the removable addressing mechanism are mounted onto the base unit, is configured to align with the removable addressing mechanism to optically read the address configured in the removable addressing mechanism; and wherein the removable addressing mechanism is electrically isolated from the base unit, the device head, and the optical address detection mechanism.

2. The addressable device of claim 1, wherein the removable addressing mechanism comprises multiple designated positions for configuring the address thereon;

wherein each designated position in the removable addressing mechanism is configurable into at least a first state having a first reflectivity level or a second state having a second reflectivity level; and wherein the first reflectivity level of a designated position in the first state and the second reflectivity level of the designated position in the second state are distinctly detectable by the optical address detection mechanism when the device head and the removable addressing mechanism are mounted onto the base unit.

3. The addressable device of claim 2, wherein the removable addressing mechanism comprises an address pennant.

4. The addressable device of claim 3, wherein the address pennant comprises a plastic unit having a reflective surface.

5. The addressable device of claim 4, wherein each designated position comprises a knock-out defined by perforations configured on the reflective surface of the address pennant.

6. The addressable device of claim 3, wherein the base unit comprises a slot configured for insertion of the address pennant thereinto and for removal of the address pennant therefrom.

7. The addressable device of claim 3,
wherein the designated position comprises a knock-out position;
wherein the designated position is configurable into the first state by leaving a knock-out in the designated position; and
wherein the designated position is configurable into the second state by removing the knock-out from the designated position.

8. The addressable device of claim 3, wherein the base unit comprises a cut-out configured to allow light from the optical address detection mechanism in the device head to illuminate the address pennant when the device head and the removable addressing mechanism are mounted onto the base unit.

9. The addressable device of claim 3,
wherein the base unit further comprises a cavity; and
wherein the address pennant is mountable onto the base unit over the cavity.

10. The addressable device of claim 9, wherein the cavity is configured to absorb or diffuse at least a portion of light that is generated by the optical address detection mechanism and is entering the cavity through holes formed by removal of one or more knock-outs from the address pennant.

11. The addressable device of claim 10, wherein the cavity comprises an interior surface configured to absorb at least a portion of the light that enters the cavity.

12. The addressable device of claim 10, wherein the cavity comprises an interior angled surface configured to reflect the light away from a hole through which the light enters the cavity.

13. The addressable device of claim 9,
wherein the base unit further comprises a cut-out configured to allow light from the optical address detection mechanism in the device head to illuminate the address pennant when the device head and the removable addressing mechanism are mounted onto the base unit; and
wherein, when the device head and the removable addressing mechanism are mounted onto the base unit, the cavity is configured to prevent environmental particles from entering the device head through the cut-out.

14. A removable addressing mechanism comprising:
multiple designated positions for configuring an address for an addressable device;
wherein the removable addressing is removably mountable onto a base unit of the addressable device;
wherein the base unit is mountable on a structure;
wherein the addressable device further comprises a device head that is removably mountable onto the base unit;
wherein the device head includes an optical address detection mechanism that, when the device head and the removable addressing mechanism are mounted onto the base unit, is configured to align with the removable addressing mechanism to optically read the address configured in the removable addressing mechanism; and
wherein the removable addressing mechanism is electrically isolated from the base unit, the device head, and the optical address detection mechanism.

15. The removable addressing mechanism of claim 14,
wherein each designated position in the removable addressing mechanism is configurable into at least a first state having a first reflectivity level or a second state having a second reflectivity level; and
wherein the first reflectivity level of a designated position in the first state and the second reflectivity level of the designated position in the second state are distinctly detectable by the optical address detection mechanism when the device head and the removable addressing mechanism are mounted onto the base unit.

16. The removable addressing mechanism of claim 15, wherein the removable addressing mechanism comprises an address pennant.

17. The removable addressing mechanism of claim 16,
wherein the address pennant comprises a plastic unit having a reflective surface; and
wherein each designated position comprises a knock-out defined by perforations configured on the reflective surface of the address pennant.

18. The removable addressing mechanism of claim 16, wherein the address pennant is insert-able into and removable from a slot configured in the base unit of the addressable device.

19. The removable addressing mechanism of claim 16,
wherein the designated position comprises a knock-out position;
wherein the designated position is configurable into the first state by leaving a knock-out in the designated position; and
wherein the designated position is configurable into the second state by removing the knock-out from the designated position.

20. A base unit of an addressable device, comprising:
a receiving portion configured for removably mounting a removable addressing mechanism thereonto;
wherein the removable addressing mechanism is configured for setting an address for the addressable device;
wherein the base unit is mountable on a structure;
wherein a device head of the addressable device is removably mountable onto the base unit;
wherein the device head includes an optical address detection mechanism that, when the device head and the removable addressing mechanism are mounted onto the base unit, is configured to align with the removable addressing mechanism to optically read the address configured in the removable addressing mechanism; and
wherein the removable addressing mechanism is electrically isolated from the base unit, the device head, and the optical address detection mechanism.

* * * * *